United States Patent [19]
Pignatelli

[11] 3,939,866
[45] Feb. 24, 1976

[54] FUEL SAVING DEVICE
[75] Inventor: Enrico Pignatelli, Rome, Italy
[73] Assignee: COM. E. IRA, S.r.C., Padova, Italy
[22] Filed: Jan. 21, 1974
[21] Appl. No.: 435,307

[52] U.S. Cl. ............ 137/493.4; 137/493.5; 220/204
[51] Int. Cl.² .......................................... F16K 17/04
[58] Field of Search ........... 137/493.1–493.6, 512.2; 220/44 R, 203, 204

[56] References Cited
UNITED STATES PATENTS

| | | | |
|---|---|---|---|
| 2,000,431 | 5/1935 | Aumack | 137/493.4 X |
| 2,133,200 | 10/1938 | Kenneweg | 137/493.3 |
| 2,191,636 | 2/1940 | Walker | 137/493.4 |
| 2,995,148 | 8/1961 | Novak et al. | 137/493.4 |
| 3,290,003 | 12/1966 | Kessler | 251/367 |

FOREIGN PATENTS OR APPLICATIONS

| | | | |
|---|---|---|---|
| 6,690 | 1902 | United Kingdom | 137/493.6 |

Primary Examiner—Robert G. Nilson
Attorney, Agent, or Firm—William G. Rhines

[57] ABSTRACT

This invention relates to means for restricting the "breathing" of closed containers of volatile fluids within desired limits of pressure and/or vacuum, and in one embodiment includes two coaxial counter-directional, pressure relief valves for use in auto gasoline tanks.

3 Claims, 3 Drawing Figures

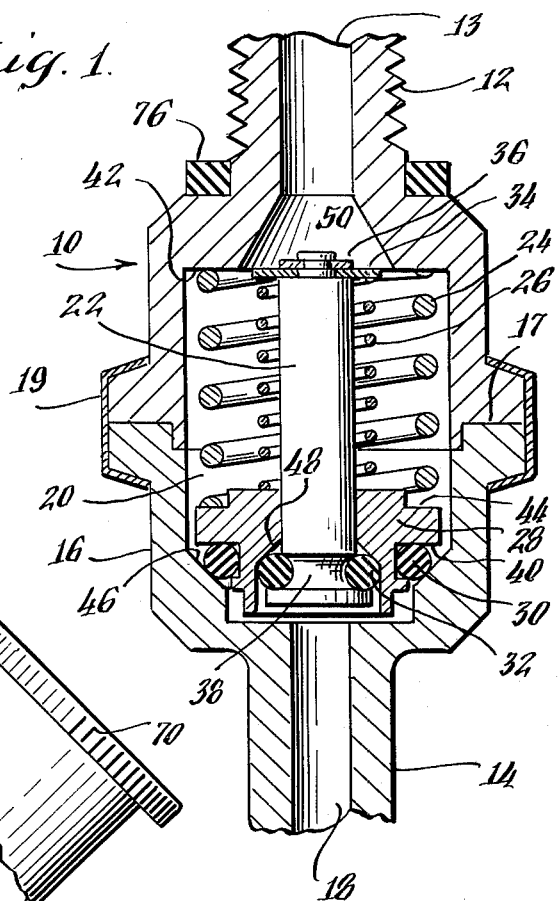
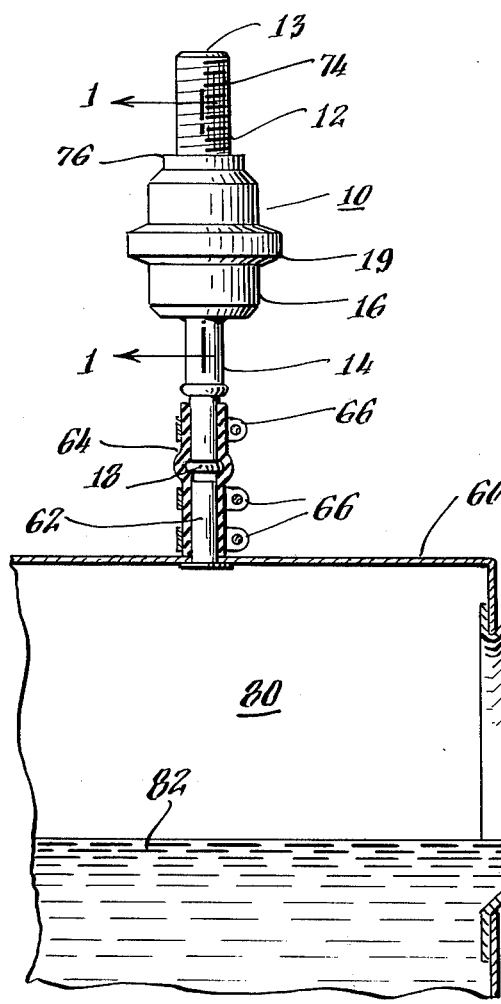
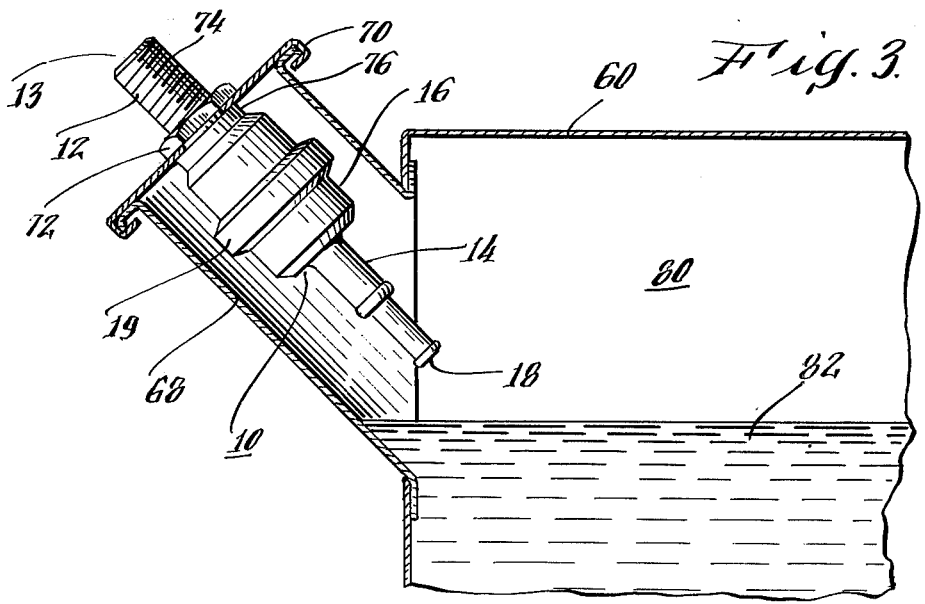

FUEL SAVING DEVICE

BACKGROUND OF THE INVENTION

Frequently, containers of volatile liquid are subject to internal pressure changes of such magnitude as to cuase the containers to burst from internal pressure or to collapse from internal vacuum unless they are reinforced to a degree which is prohibitive from the standpoint of cost and/or utilization, or unless they are vented. Thus, automobile gasoline tanks, for example, must be manufactured in a manner and from materials which are not prohibitively costly, or too heavy or cumbersome. Yet the gasoline which they contain is notoriously volatile and subject to vaporization, not only as a function of its temperature and surface area, but also as a result of the "sloshing" which takes place as the gasoline is agitated when the vehicle is in motion since, in effect, the gasoline and the atmosphere at its surface are being actively "churned" into each other, thus, by well-known physical principles, effectively increasing the surface area of the liquid gasoline which is available for evaporation to take place. In accordance with other well known physical principles relating to gases, changes in phase from liquid to gas will produce an increased volume if pressure is held constant; the alternative being to restrict volume increases causing the pressure to increase. Such pressure increases can be so substantial as to cause the tank to burst. Such pressure increases can also cause an associated fuel system of a vehicle to go out of control since the flow of fuel into the carburation system will be increased by the internal tank pressure independent of the regulation devices by which fuel flow normally is controlled.

In addition, when such pressures are not present, as the fuel is consumed from the tank, a vacuum is induced within the tank as a result of which, by operation of atmospheric pressure on the outside of the tank, makes it possible for the tank actually to collapse or, short of that, for fuel flow into an associated carburetion system to be reduced or even stopped since the vacuum can become of sufficient magnitude to overcome the fuel pump and/or the vacuum inducing capability of the carburetor.

Various means have been used to circumvent these problems, including incorporation of a vent tube or hole, usually in the top of the tank, or in the filler cap, whereby vapors under internal tank pressure may be relieved to the atmosphere, and tank vacuum may be relieved by air coming into the tank. Satisfactory as this may have been for the purpose of solving pressure differential problems, it has fallen into disfavor because of its environmental impact and wasting of energy, for as a practical matter the tank pressure and vacuum inducing causes are constantly changing, as a result of which the tank "breathes," alternately expelling gas vapor and sucking in air from the atmosphere. One adverse effect of this is to contaminate the atmosphere. Further, since those fractions of the gasoline most susceptable to evaporation are the lightest hydrocarbons, that is, components with the 4, 5 or 6 carbon atoms of the paraffinic, olefinic or aromatic series, and since there is now opinion in the technical community that these components are among those most susceptible to reaction with nitrogen dioxide in the presence of sunlight to produce the basis for the " photochemical smog" so well known, for example, in Southern California, the adverse effects of such emissions produce greater consequences than merely their presence in the atmosphere. With this in mind primarily, it has been proposed that all such gasoline tank vapor emissions must be fed into the carburetion system of the associated vehicle, but while this may help alleviate the environmental problem, it is not significantly effective with respect to mitigating the energy losses which also result from such tank "breathing."

According to well known physical principals, gasoline evaporates at its surface so long as the adjacent atmosphere remains unsaturated. Those constituents which so evaporate first and most readily are the ones having the lowest flash point, representing a valuable energy constituent of the gasoline. Thus, in a system where the atmosphere adjacent the surface of the gasoline is being maintained below the saturation level as by removal of vapors into the atmosphere or the associated carburetion system, there is a material and significant reduction in the energy potential of the gasoline as a fuel, due to removal therefrom by evaporation of low flash point constituents, and this is exagerated even more under conditions such as those which obtain in an automotive fuel system, where "sloshing" occurs and temperatures frequently become comparatively high.

Furthermore, in view of the highly competitive nature of such businesses as the automotive industry, an over-riding consideration of devices to circumvent these problems is that they must be structurally simple, operationally reliable, have low maintainence costs, and be cheap and easy to install and replace.

Accordingly, it is an object of the present invention to produce a device which will reduce or eliminate the venting from containers of volatile liquids or the introduction into such containers of atmospheric gases within desired pressure and vacuum limits.

It is another object of the present invention to provide a means for maintaining to the greatest degree practicable the saturation level of the atmosphere in a container for volatile liquids. Another object of the present invention is to provide a means for achieving the other objects of the present invention which is inexpensive to produce, structurally simple, and cheap and easy to install.

DESCRIPTION OF THE INVENTION

These and other objectives which will be apparent to those skilled in the arts may be achieved through practice of the present invention wherein two-directional pressure relief valves maintain container pressure and vacuum within prescribed limits, in one embodiment of which the valves are coaxial in a unit structure which may be affixed to the air vent or the filler cap of an automotive gasoline tank.

DESCRIPTION OF DRAWINGS

This invention may be more clearly understood by reference to the discription and claims which follow, and to the attached drawings, in which, FIG. 1 is a cross-section of one embodiment of the present invention, FIG. 2 is a depiction of one mode of application to an automotive gasoline tank of the embodiment of the present invention illustrated in FIG. 1, and FIG. 3 is a depiction of another mode of application to an automotive gasoline tank of the embodiment of the present invention illustrated in FIG. 1.

DESCRIPTION OF PREFERRED EMBODIMENTS

FIG. 1 illustrates one embodiment of the present invention in the form of a valve 10 which is particularly suited for use in the gasoline tank of automotive vehicles. This valve comprises an upper body 12, a lower body 14, and a main body 16. To facilitate manufacture and assembly, the main body 16 is divided into upper and lower halves which are integrally formed with the upper body 12 and the lower body 14 respectively, and join each other at the abuttment 17 and are held in place by a ferrule 19. Although they may be made from any of a wide variety of materials suitable for the intended use, it has been found that the upper body 14, lower body 16, shaft 22, and the ferrule 19 may advantageously be made from aluminum, and that the springs 24, 26 may advantageously be made from stainless steel. Within the upper body 12 is a vent conduit 13, and within the lower body 14 is a tank conduit 18.

Within the main body 16 is an enlarged cavity 20 in which are positioned the components of a two-directional pressure relief valve device. This device comprises a shaft 22, a pressure relief spring 24, a vacuum relief spring 26, a pressure valve gate 28, a pressure valve O-ring seal 30, a vacuum valve O-ring seal 32, a stop washer 34, and an anchor clip 36. The seals 30, 32 may be made from neoprene or other suitable material. The seal 32 resides in annular groove 38 in the lower end of the shaft 22, and the seal 30 resides in an annular groove 40 in the gate 28. As assembled and shown, the upper end of the pressure relief spring 24 resides against the upper surface of cavity 20, and since the spring 24 is under compression and its lower end resides in an annular groove 44 in the upper surface of the gate 28, the associated seal 30 is forced downward against the beveled annular surface 46 at the lower end of the cavity 20 which, in effect, forms a valve seat. As such, this portion of the assembly provides a pressure relief valve which will release as pressure within the associated tank is transmitted via the tank conduit 18 against the valve gate 28, causing the spring 24 to further compress and allow the valve to open, the pressurized vapor then moving through the cavity 20 and the vent conduit to the atmosphere or into the carburetion system of the associated vehicle as hereinafter described.

The annular O-ring seal 32 seated in the annular groove 38 of the shaft 22, is biased toward the beveled faces 48 in the gate 28 by vacuum relief spring 26 which is held under compression by means of the washer 34 that is held in place by the anchor clip 36 positioned in an annular ring 50 in the upper end of the shaft 22. By this means, when vacuum in the tank exceeds the ability of the spring 26 to hold the seal 32 against the beveled face 48 of the gate 28, the shaft 22 will move downward permitting air or other gas to move through the conduit 13, the cavity 20, vertically oriented flutes in the exterior of the shaft 22 or the interior of the associated hole in the gate 28, or other known per se passage means (not shown) and the conduit 18, and into the associated tank to relieve the vacuum.

It should be noted that in effect, the vacuum relief valve and the pressure relief valve as heretofore described are coaxial and, in effect, are counter-directional pressure relief valves; that is, one is capable of relieving relative pressure from one direction, and the other is capable of relieving relative pressure from the opposite direction. This configuration makes the composite valve particularly advantageous, both from the standpoint of simplicity of construction and from the standpoint of simplicity of installation, as hereinafter described.

FIG. 2 illustrates one mode of use of the embodiment of the present invention in vehicular gasoline tank 60. As illustrated, the lower body 14 of the valve 10 has been secured to the vent 62 in the tank 60 by means of a tube 64 made from neoprene or other suitable material, by means of clamps 66. The upper body 12 or the main body 16 may be further secured against movement by means of clamps (not shown).

FIG. 3 depicts another mode by which the embodiment of this invention illustrated in FIG. 1 may be used in a gasoline tank of a motor vehicle. As illustrated, the filler pipe 68 has a cap 70, with a hole in the center in which the upper body 12 of the valve 10 is secured by means of a nut 72 screwed on to threads 74 on the outside of the upper body 12. As in further illustrated in FIG. 1, a gasket 76 made from neoprene or other suitable material is positioned at the base of the threads 74 in order to effect a liquid and vapor tight seal between the inside of the cup 70 and the valve 10. The springs 24, 26 are selected as to length and strength such that the valve associated with them will open at pre-selected pressure valves. For use in automobile gasoline fuel tanks, for example, it has been found desirable for the tank pressure valve, i.e., the one effected by the seal 30, the gate 28, and the spring 24, to be so constructed as to open at a pressure of about 0.45 Kilograms per square centimeter, and for the tank vacuum valve, i.e., the one effected by the seal 32, and spring 26, to be so constructed as to open at a pressure of about 0.04 Kilograms per square centimeter. By this means, it is possible to maintain the pressure within the tank within a predetermined range of positive pressure to negative pressure (i.e., vacuum) thereby assuring that within that range, vapor 80 above the surface of the gasoline 82 will neither be vented from the tank nor diluted by fresh injection of sub-saturated air from outside tank, thus preserving the saturated condition of the vapor region once saturation is reached so that any new evaporation from the gasoline results in an equivalent return to the liquid gasoline from the vapor regions above it. By this means, the proportion in the gasoline of low vapor point constituents is not further decreased, and consequently the fuel value of the gasoline is not therefore further diminished.

Neither does contamination of the atmosphere occur at such times since no hydrocarbon laden vapor will then be emitted into the atmosphere.

At the same time, however, it is assured that the tank will neither burst in the event of internal pressure developing past its bursting strength, nor collapse in the event internal vacuum develops in excess of the structural strength of the tank to resist such pressures.

Yet, as will be apparent from the foregoing discussion, the practice of this invention is easily and inexpensively accomplished because the structure itself is simple, inexpensive to produce and maintain, and can be installed with a minimum of reconstruction of existing parts of a fuel system.

EXAMPLE I

An "Innocenti Mini Minor MK2" having an engine displacement of 848cc, in generally good service condition, was operated twice in Rome, Italy and its environs over the same course of approximately 200 KM first with, and then without an embodiment of the present invention attached to the auto's fuel system. In both cases fuel was purchased from the same gasoline station. Traffic and other conditions were substantially the same at the time of both tests.

In the first run, the vehicle covered an average of 9.5 KM per litre of fuel, and in the second run it covered an average of 11.05 KM per liter; the latter being about 16 percent greater mileage than the former.

EXAMPLE II

A Fiat "124" was operated over a 300 KM, extra-urban road course in Italy of varying altitude, using the same driver, fuel from the same filling station, and substantially identical speed, acceleration and pickup profiles, first without and then with an embodiment of the present invention as part of the fuel system. On the first run, the vehicle went 8.26 KM on average per liter of fuel, and on the second it went 9.4 KM per liter; an increase in the latter case of about 13.9 percent.

It should be understood that it is also possible to comply simply and easily with environmental requirements merely by having the upper body of the valve connected to the carburetion system by means of a tube made from neoprene or other suitable materials. It will also be clear that although the exact embodiment herein described is particularly useful on automotive fuel systems, the principles of this invention may be practiced advantageously on fuel systems having other applications, as well as in connection with any other containers for volatile materials where potency diminution and/or atmospheric contamination are desired to be avoided, such as in chemical processes and the like. Thus, it will be apparent that the foregoing discussions and the drawings which accompany this application, and the embodiments disclosed therein, are by way of illustration but not of limitation, and that this invention may be practiced in a wide variety of other embodiments without departing materially from the spirit or scope of this invention.

I claim:

1. A valve device for restricting the flow of gaseous material into and out of a container for volatile material owing to relative pressure differentials between the interior and exterior of said container, comprising in combination a housing consisting of an upper part and a lower part, a ferrule connecting said two parts with oneanother, a tank conduit in said lower part opening at its lower end toward the interior of said container, a vent conduit in said upper part opening at its upper end toward the exterior of said container and having a threaded outer surface, an enlarged cavity within said lower and upper parts communicating with said vent conduit and said tank conduit, an annular pressure valve gate arranged on the bottom of said cavity, a shaft inserted into a central bore of said annular gate and extending upwardly in the center of said cavity and downwardly toward the upper end of said tank conduit, an annular groove provided at the lower end of said shaft within said annular gate, a first O-ring seal arranged in said annular groove to contact a beveled annular inner surface of said gate, a second O-ring seal placed in an outer annular groove of said gate to contact a beveled annular lower wall surface of said cavity, a pressure relief spring arranged around said shaft within said cavity and abutting at its lower end on the upper surface of said annular gate and at its upper end on the upper surface of said cavity, a stop washer fastened to the upper end of said shaft by means of a groove-clip connection, a vacuum relief spring abutting at its lower end on the upper surface of said annular gate and at its upper end on said stop washer.

2. A valve device as claimed in claim 1, wherein said threaded outer surface of said vent conduit is inserted in a bore in a closure cap of said container and fastened thereto by means of a nut screwed on said threaded surface.

3. A valve device as claimed in claim 1, wherein said tank conduit is connected to the upper surface of said container by means of a vent tube in a bore made in said container upper surface and a plastic tube inserted on both said tank conduit and vent tube and fastened thereon by a plurality of annular clamps.

* * * * *